United States Patent [19]

Deguchi

[11] Patent Number: 5,110,074
[45] Date of Patent: May 5, 1992

[54] BRACKET FOR USE WITH BOLT AND BRACKET POSITION-ADJUSTABLY ATTACHED TO ELONGATE ELEMENT

[75] Inventor: Takeshi Deguchi, Toyonaka, Japan

[73] Assignee: Inaba Denki Sangyo Co., Ltd., Osaka, Japan

[21] Appl. No.: 666,795

[22] Filed: Mar. 8, 1991

[30] Foreign Application Priority Data

Mar. 12, 1990 [JP] Japan .................. 2-61609

[51] Int. Cl.⁵ ............................................. F16L 3/00
[52] U.S. Cl. .................................. 248/340; 248/62; 248/68.1
[58] Field of Search .................. 248/58, 62, 65, 59, 248/69, 74.3, 49, 317, 323, 327, 70, 68.1

[56] References Cited

U.S. PATENT DOCUMENTS

| | | | |
|---|---|---|---|
| 1,365,625 | 1/1921 | Karitzky | 248/69 |
| 2,339,565 | 1/1944 | Goldberg et al. | 248/59 X |
| 4,078,752 | 3/1978 | Kindorf | 248/59 X |
| 4,445,255 | 5/1984 | Olejak | 24/284 |
| 4,536,102 | 8/1985 | Doyle | 403/390 |
| 4,616,384 | 10/1986 | Lowell et al. | 24/335 |
| 4,834,186 | 5/1989 | Ballard | 248/59 X |

FOREIGN PATENT DOCUMENTS

| | | |
|---|---|---|
| 237688 | 9/1987 | European Pat. Off. . |
| 959109 | 5/1964 | United Kingdom . |
| 1425921 | 2/1976 | United Kingdom . |
| 2117822 | 10/1983 | United Kingdom . |
| 2158139 | 11/1985 | United Kingdom . |
| 2207996 | 2/1989 | United Kingdom . |

OTHER PUBLICATIONS

UK Search Report.

*Primary Examiner*—Ramon O. Ramirez
*Attorney, Agent, or Firm*—Webb, Burden, Ziesenheim & Webb

[57] ABSTRACT

A bracket for use with a bolt is disclosed. The bracket has a bolt holding portion between a first holder member and a second holder member formed of a plate spring urged in a bolt-holding direction. For preventing movement of the holder members along the bolt, the first holder member has a female threaded portion and the second holder member includes a stopper claw.

22 Claims, 8 Drawing Sheets

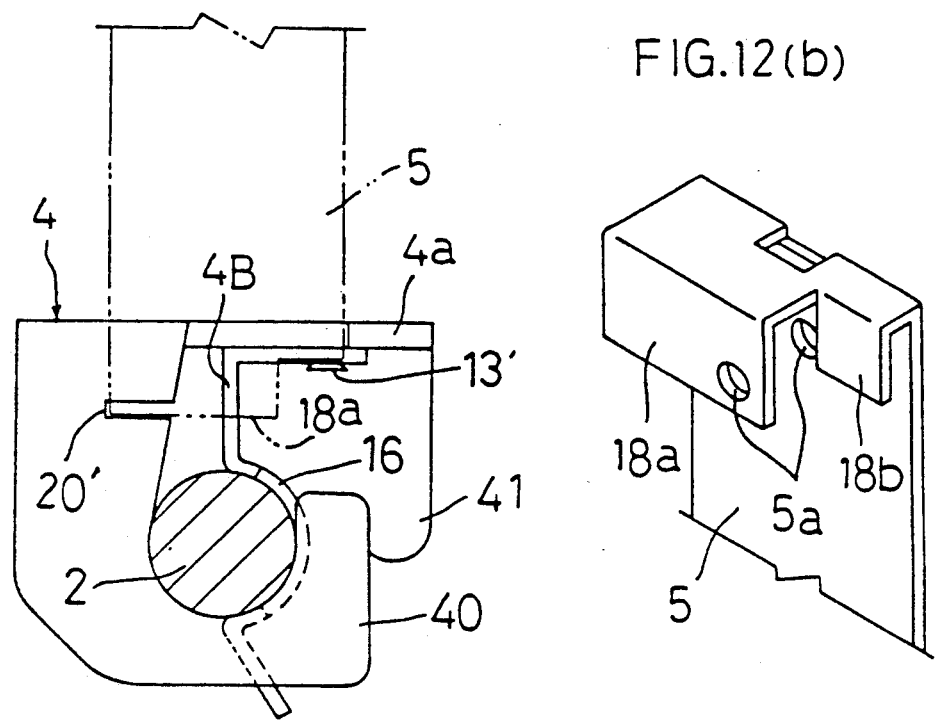
FIG. 12
FIG. 12(b)
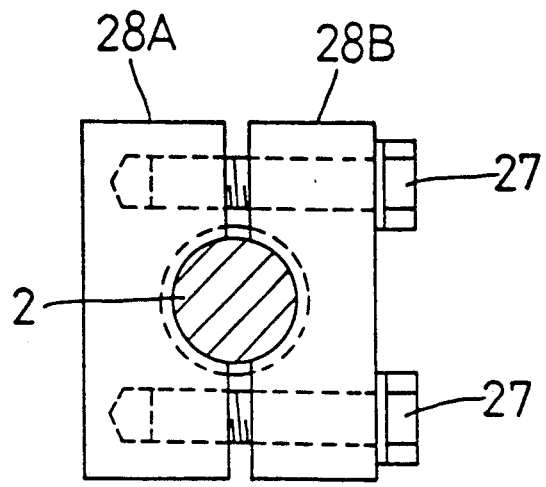
FIG. 13 (PRIOR ART)

BRACKET FOR USE WITH BOLT AND BRACKET POSITION-ADJUSTABLY ATTACHED TO ELONGATE ELEMENT

BACKGROUND OF THE INVENTION

1. Field of the Invention

The bracket invention relates to a bracket for use with a bolt and a bracket position-adjustably attached to an elongate element, and more particularly to a bracket of these types having a pair of holder members having bolt-holding portions for securely holding the bolt therebetween and a securing portion provided to at least one of the bolt-holding portions for restricting movement of the bolt along the longitudinal direction of the bolt as being secured onto threads of the bolt.

2. Description Of The Related Art

A conventional bracket for use with a bolt is shown in FIG. 13. With this convention, the bracket is attached to the bolt by connecting corresponding peripheral ends of a pair of separate nut members 28A, 28B with a bolt 27. This type of split nut construction is often preferred because the construction can be directly attached to a desired position of the bolt 2 unlike e.g. a hexagon nut which must be turned on the threads of the bolt until the nut reaches the desired position. Therefore, this construction has another advantage that the construction can be readily attached to a bolt having both terminal ends thereof closed, i.e. inaccessible without withdrawal of the bolt.

The above convention, however, has the problem of troublesome attaching operation which requires the connection of the peripheral ends of two nut members by means of the bolt, as described above.

Taking the above-state of the art into consideration, the primary object of the present invention is to provide a bracket for use with a bolt with improvement which alleviates the trouble of attaching operation.

SUMMARY OF THE INVENTION

For accomplishing the above-noted object, a bracket for use with a bolt according to the present invention comprises: a pair of holder members having holding portions for securely holding a bolt therebetween; a securing portion provided to at least one of the holding portions for restricting movement of the bracket along a longitudinal direction of the bolt as being secured onto threads of the bolt; an integrating portion disposed at one lateral side of the holding portion for integrating the holder members with each other; an inlet portion disposed at the other lateral side of the holding portion for allowing insertion of the bolt by relatively and radially moving the bolt; and urging means for urging said holder means in a direction for holding the bolt. Functions and effects of the above first characterizing features of the invention will now be described.

First, the inlet portion of the holder member is placed longitudinally along the bolt and then pressed against it. With this, the opposing holder members are pushed open to allow insertion of the bolt therebetween. In this condition, the bolt is gripped between the holder members by the urging force of the urging means and frictional resistance between the bolt and the securing portion restricts longitudinal movement of this bolt.

Detaching operation can be readily done in just the opposite manner. That is, as the holder members are forcibly withdrawn from the bolt, the holder members pivot to open against the urging force of the urging means, thus detaching the bracket from the bolt.

Accordingly, with the above first characterizing features of the present invention, the attaching and detaching operations of the bracket to the bolt can be easily done even with a single hand.

According to a second characterizing feature of the present invention, one of the holder members has a detachment-preventing member for preventing detachment of the bolt from the holder members when the bolt is gripped between the holder members.

With this second feature of the invention, the detachment-preventing member of one holder member prevents detachment of the bolt from this holder member. Then, if moment acts on the bolt to incline the securing portion, the holder members keep gripping the bolt.

A bracket position-adjustably attached to an elongate element, according to the present invention, comprises: a pair of holder members having holding portions for holding an elongate element therebetween; a threaded portion provided to at least one of the holder portions and for preventing longitudinal movement of the elongate element by coming into contact therewith; an integrating portion disposed at one lateral side of the holding portion for integrating the holder members with each other; an inlet portion disposed at the other lateral side of the holding portion for allowing insertion of the elongate element by relatively and radially moving the elongate element; and urging means for urging the holder members in a direction for holding the elongate element.

According to the above features, the bracket of the invention can be readily attached to an elongate element, like the bolt-attaching bracket described hereinbefore. Further, since the threaded portion abuts the elongate element by means of the urging means, frictional force and gripping force of this threaded portion can prevent longitudinal movement of the bracket relative to the elongate element. Moreover, in addition to the bolt, the elongate element attached with the bracket of the present invention can be any element having unevenness at a certain position or not having such unevenness.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a bracket for use with a bolt relating to the present invention; in which, FIG. 12(a) is a plane view of the ninth embodiment, FIG. 12(b) is a partially enlarged perspective view of a receiver portion, and FIG. 13 is a vertical section showing a conventional art.

DESCRIPTION OF THE PREFERRED EMBODIMENTS

A first embodiment of the present invention will be described next with reference to FIGS. 1 through 3.

Figure 1:
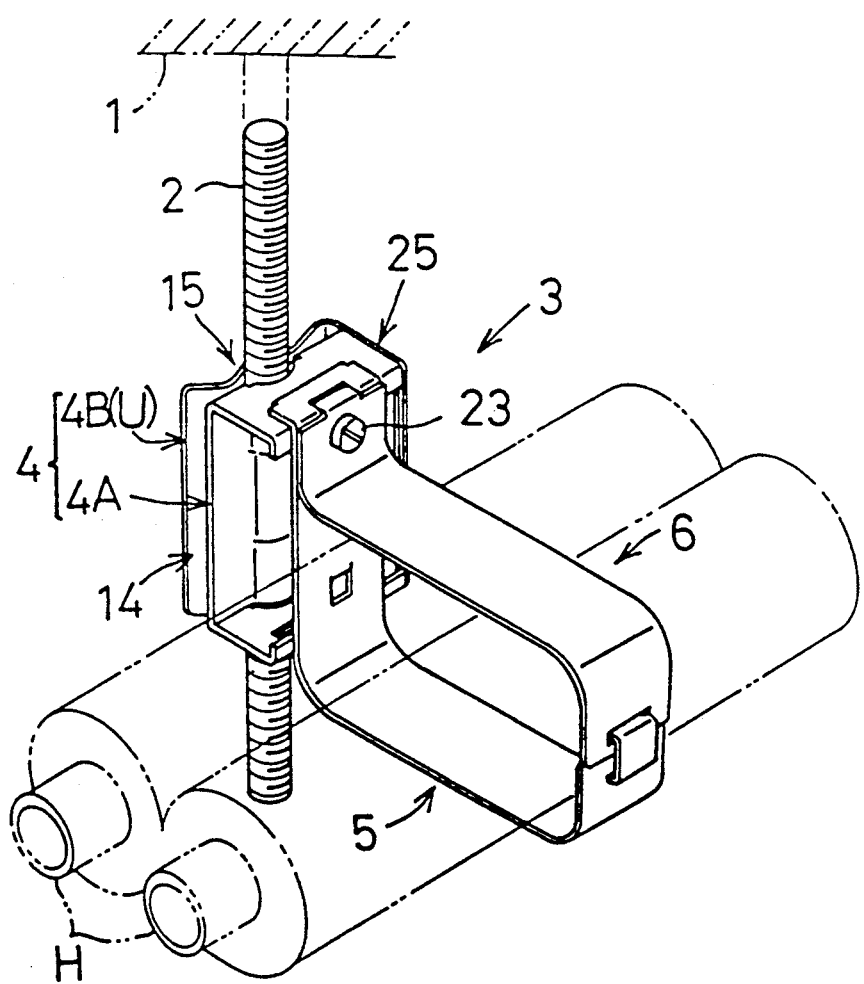
FIG. 1 is a perspective view of a bracket of a first embodiment under an attached condition.

As shown in FIG. 1, an anchor bolt 2 as an example of a bolt, is hung from a ceiling construction 1. To this anchor bolt 2, there is attached a support bracket 3 for laterally supporting a pipe H to the anchor bolt 2. This support bracket 3 includes a holding means 4 to be securely held to the anchor bolt 2, a receiver portion 5 for receiving the pipe H and a cover 6 for preventing the pipe H from dropping out of the receiver portion 5.

Figure 2:
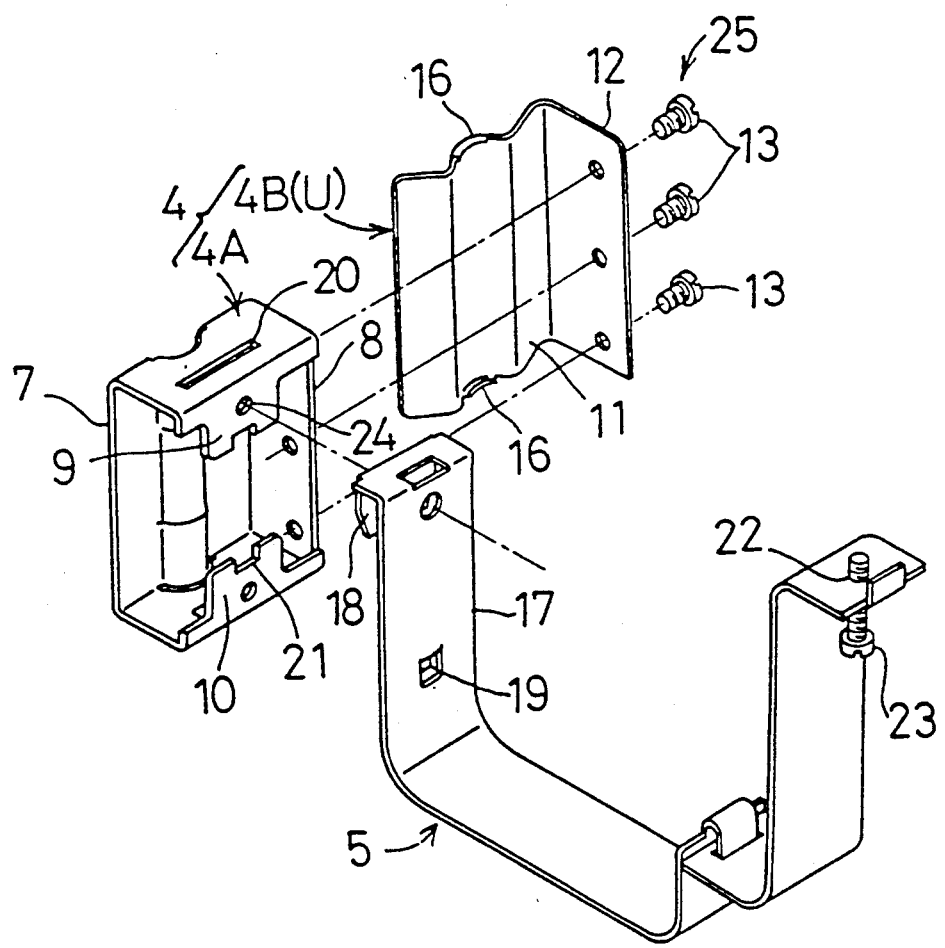
FIG. 2 is an exploded perspective view.
Figure 3:
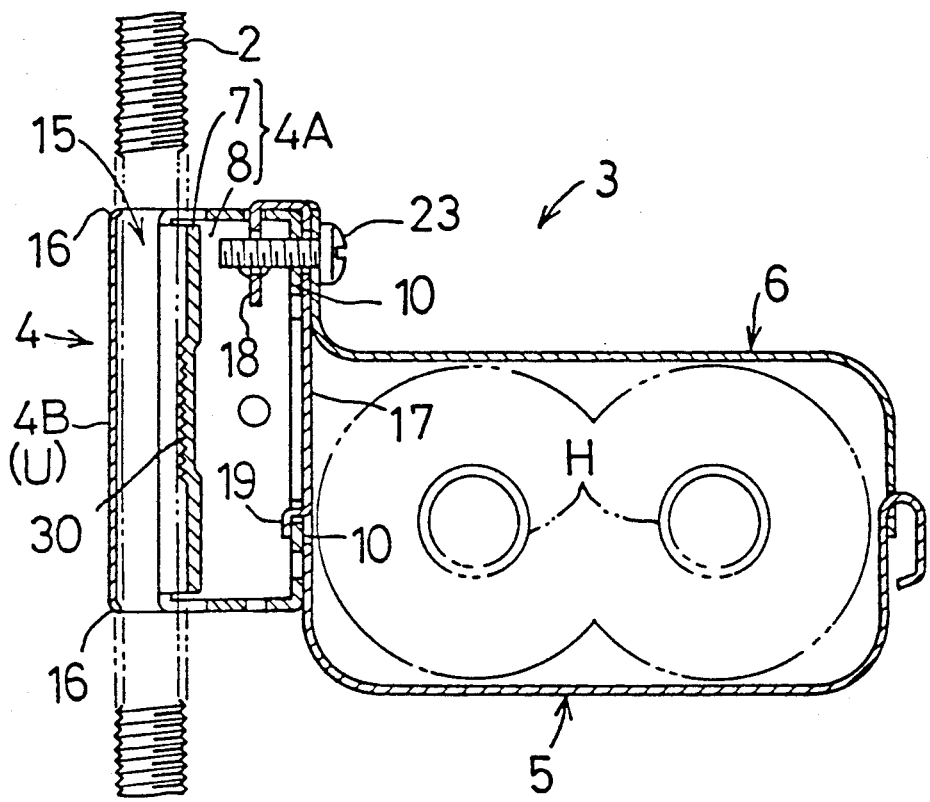
FIG. 3 is a side view in vertical section showing the bracket under the attached condition.

As shown in FIGS. 2 and 3, the holding means 4 includes a first holder member 4A formed like a channel member and a second holder member 4B formed of a plate spring acting as an urging means comprised of two curved sides, with the members 4A and 4B being connected with each other. The first holder member 4A includes a first rear wall 7 and a first side wall 8, the first rear wall 7 having an upward bent 9 and a downward bent 10 at upper and lower positions thereof. The second holder member 4B includes a second rear wall 11 and a second side wall 12. Then, the first and second side wall 8, 12 of the holder members 4A, 4B are connected with each other by means of screws 13, thus constructing an integral holding unit 25.

Between the first rear wall 7 and the second rear wall 11, there is formed a gap, and an opening formed between a free end of the second rear wall 11 and one end of the first rear wall 7 acts as an inlet opening 14 for allowing insertion of the anchor bolt 2. Further, the free end of the second rear wall 11 forming the inlet opening 14 is curved open so as to facilitate the insertion of the anchor bolt 2.

Width-wise intermediate portions of the first and second rear walls 7, 11 are curved concave to fit an outer periphery of the anchor bolt 2, such that these wall portions together as a bolt holding portion 15. Further, in this bolt holding portion 15, the concave portion of the first rear wall 7 defines a female threaded portion 30, whereas opposed ends of the second rear wall 11 are bent inwards to form stopper claws 16. That is, the bolt 2 introduced to the bolt holding portion 15 is received by the female threaded portion 30 and is stopped at the stopper claws 16, such that the bolt 2 is securely gripped at the bolt holding portion 15. The female threaded portion 30 and the stopper claws 16 will be generically referred to as a securing portion.

According to the above-described construction, as the inlet opening 14 of the holding means 4 is placed into abutment and pressed against the anchor bolt 2, the anchor bolt 2 pushes open the second rear wall 11 and comes into the bolt holding portion 15, and this bolt 2 screw-engages the female threaded portion 30 and becomes stopped by the stopper claws 16.

The receiver portion 5 is used for receiving the pipe H thereon and therefore, this receiver portion 5 is formed as a generally concave band member so as to prevent falling of the pipe H therefrom. One side wall 17 of the receiver portion 5 is extended more upwards relative to the other side wall; and at a free end of this extended side wall 17, there is integrally formed a first hook 18 projecting downwardly therefrom. Further, at a lower outer portion of this side wall, there is formed a second hook 19 projecting downwardly therefrom for hooking an edge of the downward bent 10. Then, as the first hook 18 is inserted into a slit 20 defined in an upper face of the upward bent 9 of the holding means 4 and the second hook 19 is retained at a cutout 21 defined at the edge of the downward bent 10, the entire receiver portion 5 is cantilever-wise supported to the holding means 4.

The cover 6 is pivotably supported to a leading end of the receiver portion 5 through a hinge. Accordingly, as this cover 6 is pivoted outwards, the receiver portion 5 is open. Whereas, the cover 6 is pivoted inwards, the receiver portion 5 is closed. At a free end of this cover 6, there is formed a small hole 22. Then, as a second screw 23 is inserted into this small hole 22 and screwed into a screw hole 24 of the upward bent 9, the cover 6 in the closed state is fixed to the first holding member 4A.

Accordingly, for supporting the pipe H to the support bracket 3, the second screw 23 is withdrawn from the small hole 22 and the screw hole 24 and then the cover 6 is pivoted outwards to open the receiver portion 5. Thereafter, a terminal end of the pipe H is inserted into the receiver portion 5 and the cover 6 is pivoted inwards to close the receiver portion 5. Then, the second screw 23 is again inserted into the holes 22 and 24 and tightened.

Incidentally, the slit 20 and the screw hole 24 are provided also to the downward bent 10 as well as to the upward bent 9. Therefore, the holding means 4 can be used in vertically reversed orientation.

Figure 4:
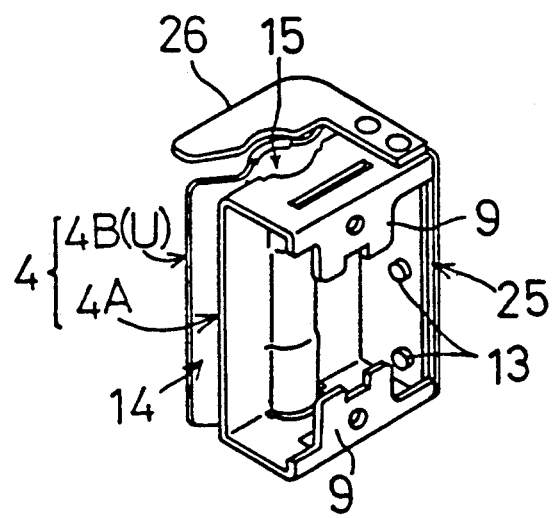
FIG. 4 is a perspective view showing a bracket according to a second embodiment of the invention.

According to a second embodiment of the present invention, as shown in FIG. 4, to an upper end face of the upward bent 9, there is attached a detachment-preventing member 26 for preventing detachment of the bolt from the first holder member 4A. With this, if, e.g. excessive load acts on the bolt during a pipe laying operation, the detachment-preventing member 26 can reliably maintain the holding condition of the holding means 4 on the anchor bolt 2. More particularly, even if moment acts on the holding means 4 due to downward load from the pipe H, the detachment-preventing member 26 receives the anchor bolt 2 so as to prevent the bolt 2 from significantly departing from the upper portion of the first holder member 4A.

Figure 5:
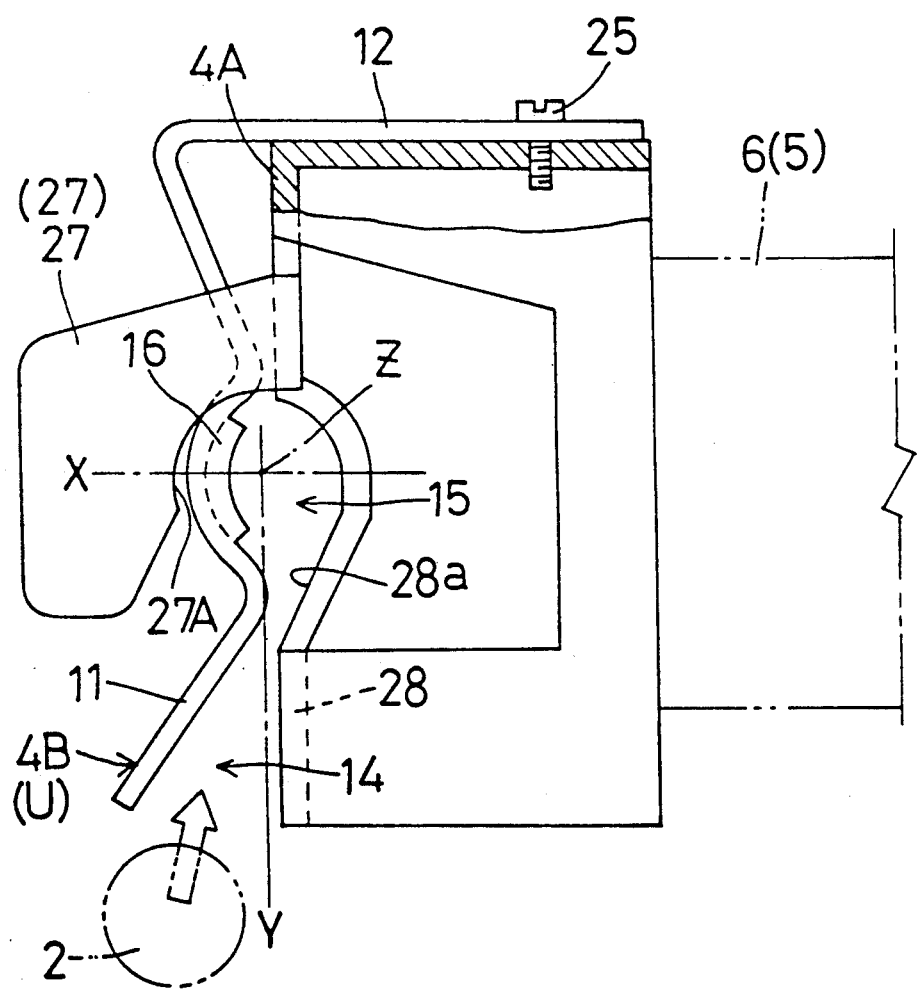
FIG. 5 is a partially cutaway plane view of a bracket of a third embodiment.

According to a third embodiment of the present invention, as shown in FIG. 5, the detachment-preventing member 27 is attached not only to the upper portion of the first holder member 4A but also to a lower portion thereof. Therefore, this construction can maintain the holding condition of the holding means 4 on the anchor bolt 2 not only against the downward load but also against upward load from the pipe H. Moreover, a detachment-preventing face 27A of each detachment-preventing member 27 is extended towards the inlet opening 14 relative to an X axis normal to a Y axis extending along the pipe laying direction and to a Z axis extending through a center axis of the bolt 2, so that the holding means 4 can more effectively maintain the holding condition against the moment about the Y axis due to the upward or downward load. Incidentally, for minimizing clearance between the anchor bolt 2 and the detachment-preventing face 27A in the direction of the X axis while maintaining extension of this detachment-preventing face 27A, a slant face 28a is formed in the first rear wall 28 adjacent the inlet opening 14.

Figure 6A:
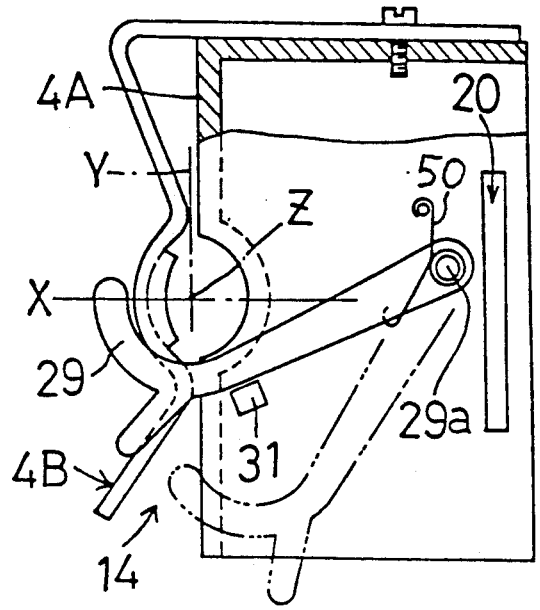
FIG. 6(a) is a partially cutaway plane view of a fourth embodiment.
Figure 6B:
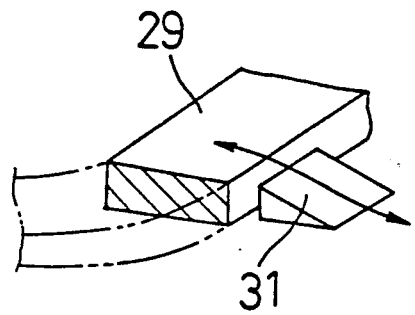
FIG. 6(b) is an enlarged view of a stopper.

According to a fourth embodiment of the present invention, as shown in FIG. 6(a), hook-shaped detachment-preventing members 29 engaging the anchor bolt 2 through the inlet opening 14 are pivotably supported respectively to upper and lower portions of the first holder member 4A, with the members 29 being urged in the engaging direction by means of torsion springs 50. Further, a pivot support portion 29a of each detachment-preventing member 29 is positioned on the opposite side to the inlet opening 14 across the X axis so as to effectively resist X-axis force resulting from moment about the Y axis. Also, for effectively resisting moment about the X axis, a stopper 31 is provided on the upper face of the first holder member 4A so as to maintain the engagement between the detachment-preventing member 29 and the anchor bolt 2. The detachment-preventing members 29 are formed of spring elements for providing vertical binding urging forces and each member 29 has a tongue for allowing detachment from the stopper 31. The stopper 31, as shown in FIG. 6(b), is formed as a projection having gradually decreasing height from the side of the detachment-preventing member to the opposite side.

Figure 7:
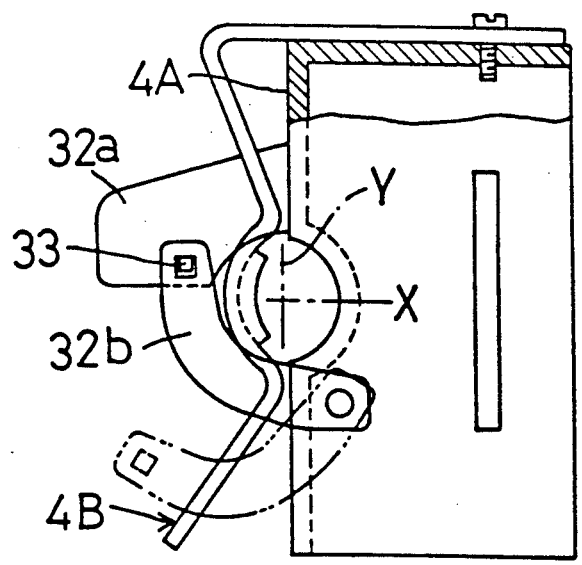
FIG. 7 is a partially cutaway plane view of a fifth embodiment.

According to a fifth embodiment of the present invention, as shown in FIG. 7, the first holder member 4A fixely supports a first detachment-preventing member 32a and pivotably supports a second detachment-preventing member 32b, with the first and second members 32a, 32b being connectable through a stopper 33.

Figure 8:
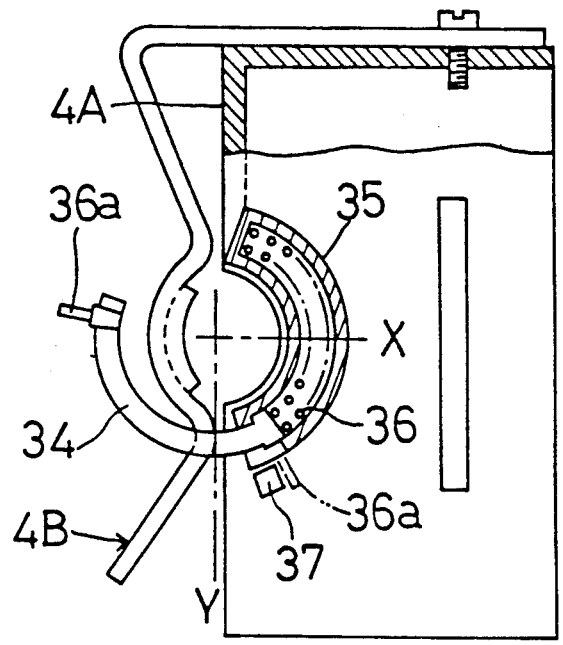
FIG. 8 is a partially cutaway plane view of a sixth embodiment.

According to a sixth embodiment of the present invention, as shown in FIG. 8, a curved detachment-preventing member 34 is disposed inside a case 35 formed on the upper face of the first holder member 4A, with the member 34 being movable into and out of the case 35 within a predetermined range and with the member 34 being urged to move out of the case 35 by means of a spring 36. At a leading end of the detachment-preventing member 34, there is attached a vertically movable tongue 36a so as to engage with a stopper 37 attached to the first holder member 4A.

Figure 9:
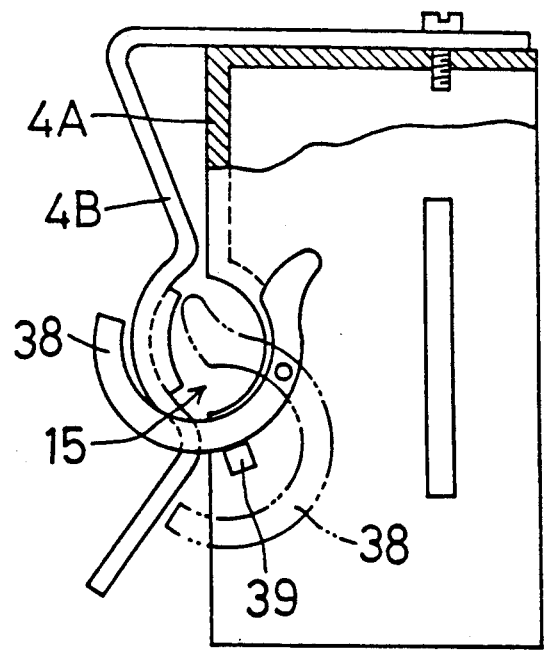
FIG. 9 is a partially cutaway plane view of a seventh embodiment.

According to a seventh embodiment of the present invention, as shown in FIG. 9, a curved horse-shoe-shaped detachment-preventing member 38 is pivotably attached to the upper face of the first holder member 4A so that an end of this member 38 projects into the bolt holding portion 15 in its opened state. Further, there is provided a stopper 39 for preventing the detachment-preventing member 38 from opening when the bracket is attached to the anchor bolt 2.

Figure 10:
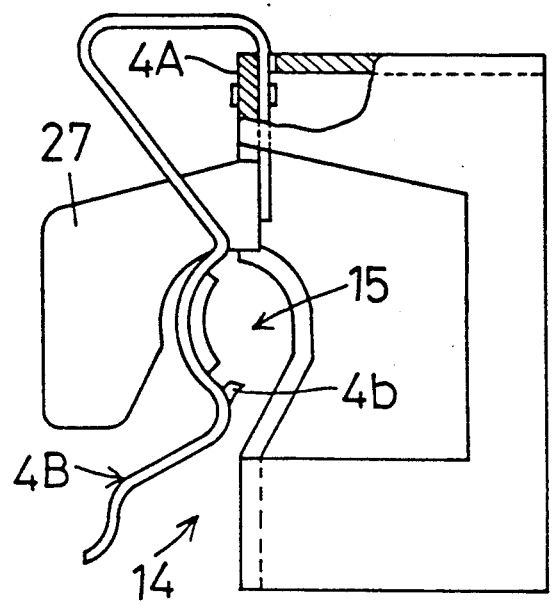
FIG. 10 is a partially cutaway plane view of an eighth embodiment.

According to an eighth embodiment of the present invention, as shown in FIG. 10, a detachment-preventing member 4b is formed as an inward projection disposed at a position of the second holder member 4B adjacent the inlet opening 14.

Figure 11:
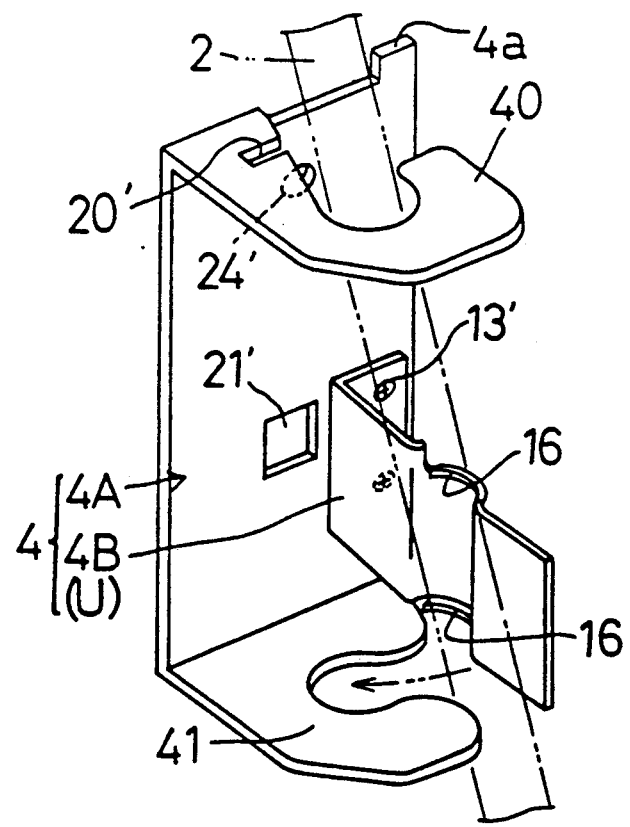
FIG. 11 is a perspective view of a ninth embodiment.

According to a ninth embodiment of the present invention, as shown in FIGS. 11 and 12(a), in the holding means 4, a second holder member 4B having substantially the same construction as that of the first embodiment is tightly connected to the first holder member 4A through the screws 13. A hook-shaped detachment-preventing member 40 is attached to the upper portion of the first holder member 4A and a second detachment-preventing member 41 having substantially the same construction as that of the second embodiment is attached to the lower portion of the first holder member 40. More particularly, the first holder member 4A forms a cutout 20' and hole 21' for hooking the receiver portion 5 and a screw hole 24' to be screwed with the second screw 23 for fixing the cover 6. Further, while the hole 21' is for hooking the second hook 19, as illustrated in FIG. 12(b) in this particular embodiment, the first hook for hooking the receiver portion 5 includes a main hook 18a to be hooked at the cutout 20' and an auxiliary hook 18b to be hooked with the body of the first holder member 4A for preventing looseness in the connection of the receiver portion 5. Further, for preventing lateral withdrawal of the auxiliary hook 18b, as shown in FIGS. 11 and 12, the first holder member 4A forms, at an upper position thereof, a projection 4a for coming into abutment with the auxiliary hook 18b. In FIG. 12(b), reference marks 5a, 5a denote insertion holes for the second screw 23.

For attachment to the anchor bolt 2, first, the first detachment-preventing member 40 is slantly oriented and then hooked to the anchor bolt 40. Then, the anchor bolt 2 is pressed into the bracket between the lower-positioned, second detachment-preventing member 41 and the second holder member 4B while elastically deforming the second holder member 4B. Thereafter, as the receiver portion 5 is held to the first holder member 4A through the first hook 18a, 18b and so on, the gap between the hook-shaped leading end of the first detachment-preventing member 40 and the main hook 18a becomes smaller than the diameter of the anchor bolt 2, thus preventing detachment of the bolt 2 from the holding means 4.

Some other embodiments of the present invention will be specifically described next.

Both of the first and second holder members 4A and 4B may be formed of plate springs. Or, instead of forming these members 4A, 4B of plate springs, it is conceivable to provide a separate urging means U between these holder members 4A, 4B.

It is conceivable for both the holder members 4A, 4B to form the female threaded portion and the projection.

The holder members 4A and 4B can be integrally formed of one same element in advance. In this case, the integrated holding unit 25 will be positioned between the holder members 4A, 4B formed continuous with each other.

The present invention is applicable not to such bolts as the anchor bolt 2 but also to any elements having unevenness in their surfaces such as an iron reinforcing rod for ferroconcrete construction work. Further, with increased friction at the securing portion, the holder means 4 can maintain position of any elongate member without surface unevenness. For increasing the friction of the securing portion, it is conceivable e.g. to form the second holder member 4B of a plate spring having a strong urging force. As another conceivable method, the stopper claws 16, 16 can be provided more centerwards, such that the Y-axis moment causes the upper stopper claws 16 and the lower portion of the first holder member 4A to strongly press against the periphery of the uneven elongate member thus providing strong friction thereto.

The essential function of the detachment-preventing members of the present invention is to prevent detachment of the bolt from the holding means 4 at least in one direction of the bolt 2. Also, this detachment-preventing member can be provided either of the first and second holder members 4A and 4B. Also, in the above embodiments, the first holder member 4A and the detachment-preventing member are formed of such material as iron and aluminum so as not to be easily deformed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A bracket for use with a bolt comprising:
   a pair of holder members having holding portions for securely holding a bolt therebetween;
   a securing portion provided to at least one of the holding portions for restricting movement of the bracket along a longitudinal direction of the bolt as being secured onto threads of the bolt;
   an integrating portion disposed at one lateral side of said holding portions for integrating said holder members with each other;
   an inlet portion disposed at the other lateral side of said holding portions for allowing insertion of said bolt by relatively and radially moving said bolt; and
   urging means for urging said holder members in a direction for holding said bolt.

2. A bracket as defined in claim 1, wherein said inlet portion is surrounded by said pair of holder members.

3. A bracket as defined in claim 1, wherein said securing portion includes a claw provided on one of said holder members and a female threaded portion is provided on the other of said holder members.

4. A bracket as defined in claim 3, wherein said urging means comprises at least one of said holder members formed of a plate spring curved open on the side of said inlet opening.

5. A bracket as defined in claim 4, wherein said elongate element has unevenness at least at one portion thereof, said threaded portion acting as a stop for said unevenness.

6. A bracket position-adjustably attached to an elongate element, the bracket comprising:
   a pair of holder members having holding portions for holding an elongate element therebetween;
   a threaded portion provided to at least one of said holder portions and for preventing longitudinal movement of the elongate element by coming into contact therewith;
   an integrating portion disposed at one lateral side of said holding portions for integrating said holder members with each other;
   an inlet portion disposed at the other lateral side of said holding portions for allowing insertion of said elongate element by relatively and radially moving said elongate element; and
   urging means for urging said holder members in a direction for holding said elongate element.

7. A bracket as defined in claim 6, wherein said inlet portion is surrounded by a pair of holder members.

8. A bracket as defined in claim 6, wherein said elongate element has unevenness at least at one portion thereof, said threaded portion acting as a stop for said unevenness.

9. A bracket as defined in claim 7, wherein said urging means comprises at least one of said holder members formed of a spring.

10. A bracket as defined in claim 9, wherein one of said holder members has a detachment-preventing member for preventing detachment of said bolt from said holder members when said bolt is gripped between said holder members.

11. A bracket as defined in claim 10, wherein said one holder member comprises a plate spring bent open towards said inlet opening.

12. A bracket as defined in claim 11, wherein said securing portion includes a claw provided to said plate spring and a female threaded portion provided to the other holder member.

13. A bracket as defined in claim 12, wherein said other holder member includes attaching portions for attaching a receiver member for receiving a pipe thereon.

14. A bracket as defined in claim 13, wherein said detachment-preventing member is fixed to said other holder member and for preventing detachment of said bolt by limiting movement of said bolt away from said preventing member.

15. A bracket as defined in claim 14, wherein said detachment-preventing member is provided at least to an upper position of said other holder member.

16. A bracket as defined in claim 15, wherein two of said detachment-preventing members are attached to upper and lower positions of said other holder member, with said upper detachment-preventing member being formed like a hook.

17. A bracket for use with a bolt comprising:
    a pair of holder members having holding portions for securely holding a bolt therebetween, wherein one of said holder members comprises a plate spring bent open towards said inlet opening forming a detachment-preventing member for preventing detachment of said bolt from said holder members when said bolt is gripped between said holder members;
    a securing portion provided to at least one of the holding portions for restricting movement of the bracket along a longitudinal direction of the bolt as being secured onto threads of the bolt, wherein said securing portion includes a claw provided to said plate spring and a female threaded portion provided to the other holder member;
    an integrating portion disposed at one lateral side of said holding portion for integrating said holder members with each other;
    an inlet portion disposed at the other lateral side of said holding portion for allowing insertion of said bolt by relatively and radially moving said bolt; and
    urging means for urging said holder members in a direction for holding said bolt, wherein said urging means comprises at least one of said holder members formed of a spring.

18. A bracket as defined in claim 17, wherein said other holder member includes attaching portions for attaching a receiver member for receiving a pipe thereon.

19. A bracket as defined in claim 18, wherein said detachment-preventing member is fixed to said other holder member and for preventing detachment of said bolt by limiting movement of said bolt away from said preventing member.

20. A bracket as defined in claim 19, wherein said detachment-preventing member is provided at least to an upper position of said other holder member.

21. A bracket as defined in claim 20, wherein two of said detachment-preventing members are attached to upper and lower positions of said other holder member, with said upper detachment-preventing member being formed like a hook.

22. A bracket position-adjustably attached to an elongate element, the bracket comprising:

a pair of holder members having holding portions for holding an elongate element therebetween, wherein said elongate element has unevenness at least at one portion thereof;

a threaded portion provided to at least one of said holder portions and for preventing longitudinal movement of the elongate element by coming into contact therewith, said threaded portion acting as a stop for said unevenness of said elongate member;

an integrating portion disposed at one lateral side of said holding portion for integrating said holder members with each other;

an inlet portion disposed at the other lateral side of said holding portion for allowing insertion of said elongate element by relatively and radially moving said elongate element; and urging means for urging said holder members in a direction for holding said elongate element, wherein said urging means comprises at least one of said holder members formed of a plate spring curved open on the side of said inlet opening.

* * * * *